United States Patent [19]

Eastmond

[11] 3,851,253

[45] Nov. 26, 1974

[54] AUTOMATICALLY ADJUSTABLE FM RECEIVER SQUELCH

[75] Inventor: Bruce C. Eastmond, Darien, Ill.

[73] Assignee: Motorola, Inc., Chicago, Ill.

[22] Filed: May 25, 1973

[21] Appl. No.: 363,906

[52] U.S. Cl. .................. 325/348, 325/469, 325/478

[51] Int. Cl. .............................................. H09b 1/10

[58] Field of Search ....... 325/55, 64, 348, 392, 466, 325/478, 480, 402, 403, 496, 969, 470

[56] References Cited

UNITED STATES PATENTS

| | | | |
|---|---|---|---|
| 3,534,268 | 10/1970 | Mazziota et al. | 325/478 |
| 3,617,895 | 11/1971 | Tomsa et al. | 325/469 X |
| 3,714,579 | 1/1973 | Valdes et al. | 325/478 |
| 3,748,495 | 7/1973 | Messinger | 325/478 |
| 3,803,495 | 4/1974 | Reynolds | 325/470 |

*Primary Examiner*—Benedict V. Safourek
*Assistant Examiner*—Aristotelis M. Psitos
*Attorney, Agent, or Firm*—Eugene A. Parsons; Vincent J. Rauner

[57] ABSTRACT

An automatically adjustable squelch circuit which responds to detected noise and modulation signals from a receiver discriminator to actuate a switch and includes control circuitry which responds to receipt of a command signal to initialize sequential development of control signals. A variable attenuator coupled to the discriminator and to the control circuit responds to each of the control signals in sequence to attenuate signals coupled therethrough from the discriminator by a predetermined amount. The attenuated signals are coupled to a detector which develops the detection signal when the signals coupled thereto exceed a predetermined level. The control circuit is operative in response to the detection signal to terminate the sequence and maintain the last developed control signal in the sequence.

16 Claims, 1 Drawing Figure

PATENTED NOV 26 1974 3,851,253
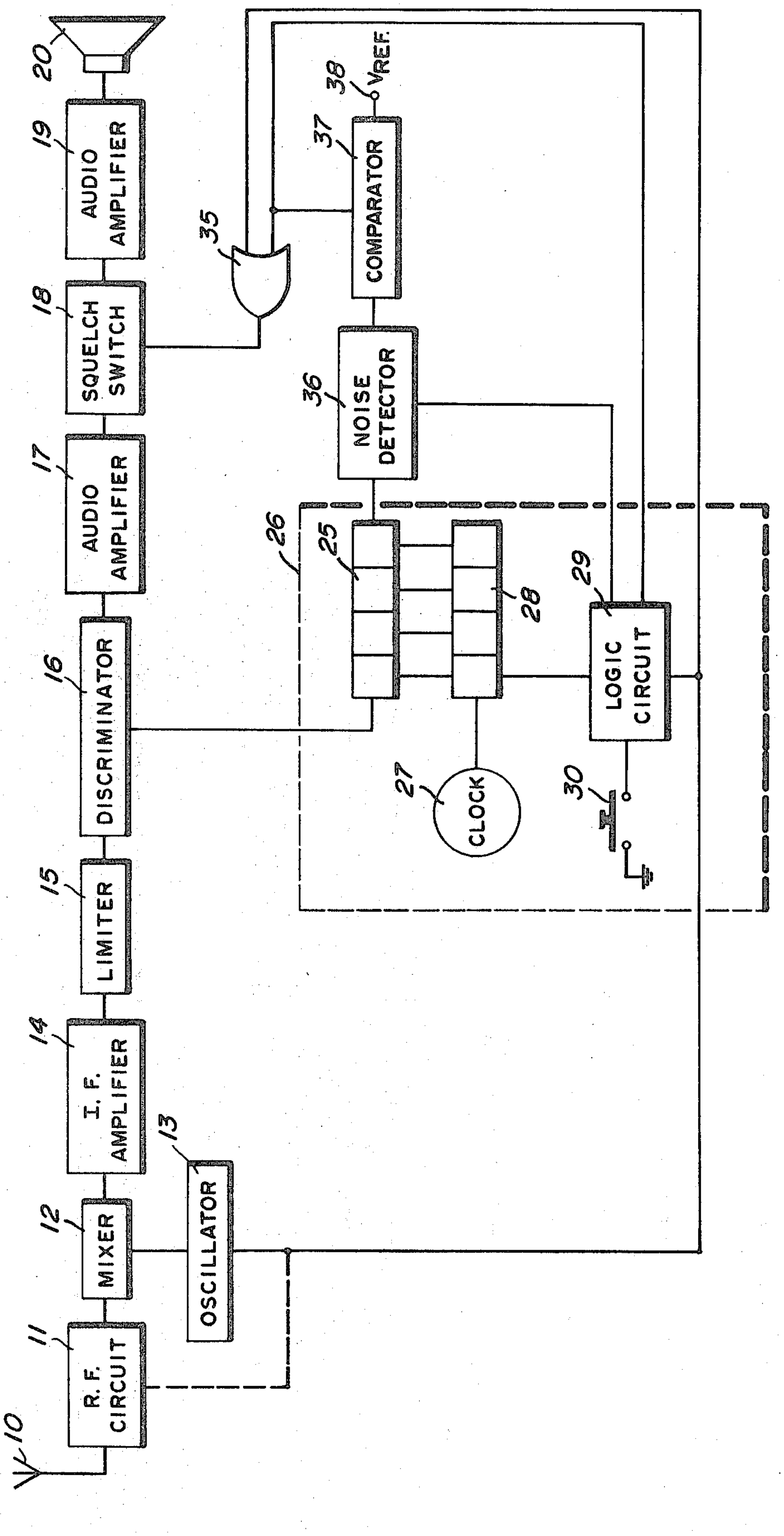

AUTOMATICALLY ADJUSTABLE FM RECEIVER SQUELCH

BACKGROUND

Squelch circuits, responsive to the detected receiver noise at the receiver discriminator, are used in communications receivers to eliminate noise output from the audio section during periods when no signal is received. A number of different types of circuits may be employed to provide the squelch function. For example, U.S. Pat. No. 3,568,068, issued to Russell, Jr., and assigned to the same assignee as this application shows one form of squelch circuit; and U.S. Pat. No. 3,603,884 issued to Zaura, Jr., et al., and assigned to the same assignee as this application show a second form of squelch circuit. In both the above-noted squelch circuits, a potentiometer is employed for setting the desired point at which squelch operation is to occur. This potentiometer is manually controlled by the radio user and may be adjusted to whatever squelch setting he desires. If the user adjusts the potentiometer for a condition commonly known as "tight squelch" the receiver will not respond to messages which are below a predetermined signal strength. In such a case, the user may miss an important message because of the insensitivity of this squelch circuit.

Certain radios are equiped with squelch circuits that have pre-set controls. These controls are pre-set at a rather tight squelch in order to prevent an unsquelched condition from occurring due to low or high battery voltage, circuit aging and usage and noise levels in various areas. Again, because of the insensitivity of this squelch control, messages transmitted with a low signal strength may be missed because of squelch insensitivity.

In the first example described above, the user may adjust the potentiometer in order to provide the preferred squelch setting. In the second example, the radio cannot be reset unless returned to a shop or factory.

SUMMARY

It is, therefore, an object of this invention to provide an automatically adjustable squelch circuit for a radio receiver.

It is another object of this invention to provide an automatically adjustable squelch circuit for a receiver which maintains the squelch circuit at substantially a threshold squelch condition.

In practicing this invention, an automatically adjustable squelch circuit is provided which is responsive to detected noise and modulation signals from a receiver discriminator to actuate a switch. The switch may be used to inhibit audio signals from being coupled to the speaker. The squelch circuit includes control circuitry which is responsive to the receipt of a command signal to initialize sequential development of control signals. A plurality of variable attenuators are coupled to the discriminator and the control means. The attenuators are each responsive to the control signals in the sequence to attenuate signals coupled thereto from the discriminator by a predetermined amount. The first control signal in the sequence provides maximum attenuation to the signals and each control signal thereafter in the sequence causes a reduction in the attenuation by the predetermined amount. A detector is coupled to the attenuator and is responsive to the attenuated signals coupled thereto exceeding a predetermined level to develop a detection signal. The switch is coupled to the detector via circuit means, and is responsive to the detection signal to actuate. The detection signal is also coupled to the control circuit which is responsive to the detection signal to terminate the sequential development of the control signals and maintain the last developed control signal in the sequence.

DETAILED DESCRIPTION

Referring to the drawing, there is shown a receiver which includes an antenna 10 for applying signals to a radio frequency (RF) circuit 11. Radio frequency circuit 11 may include frequency selective circuits and may or may not include amplifying circuits. The selected signals from RF circuit 11 are applied to mixer 12. Oscillator 13 provides an injection frequency signal so that the resultant frequency signal developed by mixer 12 is an intermediate frequency (IF) signal. The intermediate frequency signal is amplified in stages indicated at 14. It is to be understood, however, that although a single mixer and oscillator are shown, which constitutes one conversion, more stages of frequency conversion may be provided in order to provide an intermediate frequency signal at the desired frequency. The intermediate frequency signal amplified in stages 14 is limited in limiter 15, and is applied to discriminator 16. Discriminator 16 may be of a known circuit configuration which is constructed to reproduce the audio modulation signals, and noise signals greater in frequency than the audio modulation signals. The output of discriminator 16 is applied to audio amplifier 17 which amplifies the audio modulation signals and includes a filter for attenuating the noise signals greater in frequency than the audio modulation signals. The audio signals amplified in audio amplifier 17 are coupled through squelch switch 18 to audio amplifier 19 where they are further amplified and coupled to a loudspeaker 20 or other device for reproducing the modulation signals.

Signals developed at discriminator 16 are also coupled to variable attenuator 25 in control circuit 26. Variable attenuator 25 in the preferred embodiment is a four stage attenuator. That is, four different attenuation circuits can be actuated either separately or in combination to provide up to 16 levels of attenuation. A clock 27 continuously develops timing signals or pulses at predetermined intervals. These timing signals are coupled to a counter 28 which consists of a plurality of bistable multivibrators, or flip-flops, connected to provide a counting function. In the preferred embodiment, counter 28 includes four stages and is therefore capable of providing 16 different binary combinations of signals at the four output terminals. Each one of the four separate outputs of counter 28 in the preferred embodiment are coupled to one of the four separate stages in variable attenuator 25. A logic circuit 29 is connected to counter 28 and starts and stops the counting cycle of counter 28. Pushbutton 30 is coupled to logic circuit 29 and upon actuation will provide a ground or command signal to logic circuit 29 initializing its operation. Logic circuit 29 is also shown coupled to OR gate 35 and oscillator circuit 13, and via dotted line connection to RF circuit 11. The function of these interconnections will be described in a subsequent portion of this application.

Signals coupled through variable attenuator 25 are coupled to noise detector 36. Noise detector 36 may be a standard squelch circuit such as is shown and described in either the above-noted Russell, Jr., or Zaura, Jr., et al., patents. In this application, however, the potentiometer in both of the above-noted patents which provides the manual squelch operation is either eliminated or fixed at the zero impedance to allow the full noise signals to pass through the remaining portions of the squelch circuit. Noise detector 36 responds to the noise signals coupled thereto to develop an output signal which varies in accordance with the level of the noise signals. This output signal is coupled to comparator 37 where it is compared to a reference signal coupled to comparator 37 from terminal 38. If the signal from noise detector 36 exceeds the reference signal, comparator 37 will develop a detection signal. This detection signal is coupled to OR gate 35 causing OR gate 35 to change states and develop an OR gate signal. The OR gate signal is coupled to squelch switch 18 causing squelch switch 18 to change states and inhibit further coupling of audio signals from audio amplifier 17 to audio amplifier 19. Although the preferred embodiment shows use of a noise detector comparator and OR gate, it is to be understood that other forms of squelch circuit implementation may be employed. For example, the noise detector may respond to the presence of noise signals in excess of a predetermined level to develop a detection signal which is coupled directly to squelch switch 18. An inhibit circuit may also be coupled to squelch switch 18 and to logic circuit 29, and used in the same manner as OR gate 35.

The automatically adjustable squelch circuit operates as follows. Upon actuation of pushbutton 30, logic circuit 29 in control circuit 26 develops an inhibit signal which is coupled to oscillator 13 or RF circuit 11. This inhibit signal disables the oscillator or enables an RF attenuator in RF circuit 11 so that the presence of a signal on the receiver channel will not alter the noise level coupled to noise detector 36. If the receiver oscillator 13 is disabled, it is understood that IF amplifier 14 and limiter 15 must develop a limited signal in response to internally developed noise which is coupled to discriminator 16. The inhibit signal is also coupled to OR gate 35. OR gate 35 changes state in response to the inhibit signal and develops an OR gate signal which is coupled to squelch switch 18. Squelch switch 18 responds to the OR gate signal to inhibit coupling of audio from audio amplifier 17 to audio amplifier 19. This function is necessary in order to maintain a squelch condition for the receiver audio during the automatic adjustment procedure.

A discharge signal is also developed by logic circuit 29 which is coupled to noise detector 36. This discharge signal causes the output signal of detector 36 to reduce to zero and discharge all residual energy which may have been developed and already stored in the filter portion of noise detector 36. The noise detector 36 is now in an initialized condition.

Another signal developed by logic circuit 29 in response to actuation of pushbutton 30 is coupled to counter 28. The signal coupled to counter 28 resets counter 28 to a zero state and allows 28 to begin counting clock pulses coupled from clock 27. With counter 28 reset to its initialized condition, the signals coupled from the four stages of counter 28 to the four stages of variable attenuator 25 cause all the stages of attenuator 25 to activate and provide maximum attenuation of signals coupled from discriminator 16 to noise detector 36. With each count by counter 28, a different set of binary signals are coupled from the four stages of counter 28 to the four stages of variable attenuator 25. Each new set of binary signals causes the attenuation provided by variable attenuator 25 to decrease in predetermined steps. The duration of each step or attenuation level is controlled by clock 27. The frequency of clock 27 is set such that each step of attenuation is sustained for a duration sufficient to insure that the noise signals developed by noise detector 36 have reached a steady state corresponding to the level of the signals coupled from discriminator 16.

The stepped decrease in attenuation provided by variable attenuator 25 will continue until the signal coupled from discriminator 16 to noise detector 36 is sufficient to cause noise detector 36 to develop an output signal which is greater in amplitude than the reference signal coupled to comparator 37 from terminal 38. When the output signal developed by noise detector 36 exceeds this reference signal level, comparator 37, as noted above, will change states and develop a detection signal. This detection signal, in addition to being coupled through OR gate 35 to squelch switch 18 to maintain a squelched condition, is also coupled to logic circuit 29 in control circuit 26. Logic circuit 29 responds to the detection signal by terminating the signal coupled to counter 28. Removal of the signal coupled to counter 28 inhibits further counting and causes the counter to be maintained at its last state. That is, if counter 28 has counted eight clock pulses from clock 27 subsequent to initialization of operation, it will remain in the eight count state and developed binary signals at the four outputs which correspond to this eight count.

Logic circuit 29 is also responsive to the receipt of the detection signal from comparator 37 to terminate the inhibit signal coupled to OR gate 35 and oscillator 13 or RF circuit 11. The entire automatic squelch adjustment procedure has now been completed and the receiver is ready for normal usage.

As the squelch circuit has been automatically adjusted to a point which provides squelch operation and inhibits audio when ON channel signals are not present the receiver will be set substantially at threshold squelch so that the presence of any ON channel signal will cause the squelch circuit to actuate and allow audio signals to be coupled to speaker 20.

Although operation of the automatically adjustable squelch circuit is shown as being initiated by actuation of a switch 30, it is to be understood that this application is not limited to this form of actuation nor to only manual actuation. Switch 30 may, for example, be replaced by a tone detector coupled to discriminator 16 which is responsive to receipt of a predetermined tone, or tones, either simultaneously or in sequence to provide a contact closure which is coupled to logic circuit 29 in order to initialize operation of logic circuit 29.

As can be seen, an automatically adjustable squelch circuit for a radio receiver has been provided. This automatically adjustable squelch circuit maintains the squelch at substantially a threshold squelch condition.

I claim:

1. An automatically adjustable squelch circuit responsive to detected noise and modulation signals from a receiver discriminator to actuate a switch, said squelch including in combination;

control means responsive to receipt of a command signal to initialize sequential development of control signals, variable attenuation means coupled to said discriminator and to said control means, said attenuator means being responsive to each of said control signals in said sequence to attenuate signals coupled therethrough from said discriminator by a predetermined amount, detector means coupled to said attenuator means for receiving said attenuated signals, said detector means being responsive to said signals exceeding a predetermined level to develop a detection signal, means coupling said detector means to said switch means, said switch being operative in response to said detection signal to actuate, said control means further being responsive to receipt of said detection signal to terminate said sequence and maintain said last developed control signal in said sequence.

2. The squelch circuit of claim 1 wherein said control means includes timing means for developing a timing signal at predetermined intervals, and circuit means coupled to said timing means and operative in response to each one of said timing signals to develop one of said control signals in said sequence.

3. The squelch circuit of claim 2 wherein said attenuator means includes a plurality of attenuator circuits coupled to said circuit means, each of said attenuator circuits being responsive to one of said control signals to change the attenuation through said attenuator means by said predetermined amount.

4. The squelch circuit of claim 3 wherein said circuit means includes bistable means, said control signals are binary signals and said timing means is a clock.

5. The squelch circuit of claim 4 wherein said control means is further operative in response to said command signal to develop a discharge signal, said detector means being coupled to said control means and operative in response to said discharge signal to initialize said detector means.

6. The squelch circuit of claim 5 wherein said detector means includes detection circuitry responsive to the presence of said signals to develop a first signal varying in accordance with the amplitude of said signals, comparison means coupled to said detection circuitry and operative in response to said first signals exceeding a predetermined amplitude to develop said detection signal.

7. The squelch circuit of claim 6 wherein said means coupling said detector means to said switch includes a switching circuit operative in response to said detection signal to develop a second signal, said switch being operative in response to said second signal to actuate.

8. The squelch circuit of claim 7 wherein said control means is coupled to said comparator means, said control means being operative in response to said detection signal to terminate said sequence and maintain said last developed control signal in said sequence.

9. The squelch circuit of claim 8 wherein said control means is further operative in response to said command signal to develop an inhibit signal, said switching circuit being coupled to said control means and operative in response to said inhibit signal to develop said second signal.

10. In a frequency modulation receiver including means for receiving a modulated wave and for converting the same to an intermediate frequency wave, and including low frequency amplifying means for the derived modulating signal the combination including, discriminator means for deriving from the intermediate frequency wave the modulating signal and noise signals extending in a frequency range substantially greater than the modulating signal which noise signals increase substantially in amplitude in the absence of the modulating signal, control means responsive to receipt of a command signal to initialize sequential development of control signals, variable attenuation means coupled to said discriminator means and to said control means, said attenuator means being operative in response to each of said control signals in said sequence to attenuate said noise signals coupled therethrough from said discriminator by a predetermined amount, detector means coupled to said attenuator means, said detector means being operative in response to said noise signals exceeding a predetermined level to develop a detection signal, and second circuit means coupling said detector means to the low frequency amplifying means of the receiver for squelching the low frequency amplifying means in response to said detection signal, said control means further being operative in response to receipt of said detection signal to terminate said sequence of control signals and maintain said last developed control signal in said sequence.

11. The squelch circuit of claim 10 wherein said second circuit means includes first switch means coupled to said detector means and operative in response to said detection signal to develop a first signal, and second switch means coupled to said first switch means and said low frequency amplifying means and operative in response to said first signal to squelch the low frequence amplifying means.

12. The squelch circuit of claim 11 wherein said detector means includes detection circuitry responsive to the presence of said noise signal to develop a second signal varying in accordance with the amplitude of said noise signals, and comparison means coupled to said detection circuitry and operative in response to said second signal exceeding a predetermined amplitude to develop said detection signal.

13. The squelch circuit of claim 12 wherein said control means is further operative in response to said command signal to develop a discharge signal, said detection circuitry being coupled to said control means and operative in response to said discharge signal to reduce said second signal to zero.

14. The squelch circuit of claim 13 wherein said control means is further operative in response to said command signal to develop an inhibit signal, said first switching circuit being coupled to said control means and is operative in response to said inhibit signal to develop said first signal.

15. The squelch circuit of claim 14 wherein said control means includes timing means for developing a timing signal at predetermined intervals, and third circuit means operative in response to each one of said timing signals to develop one of said control signals in said sequence.

16. The squelch circuit of claim 15 wherein said attenuator means includes a plurality of attenuator circuits coupled to said circuit means, each of said attenuator circuits being operative in response to one of said control signals to change the attenuation through said attenuator means by said predetermined amount.

* * * * *